May 31, 1949.    E. VON MÜLINEN    2,471,800
SHADOW IMAGE PROJECTION INDICATING APPARATUS
Filed Sept. 25, 1944
Fig.1.
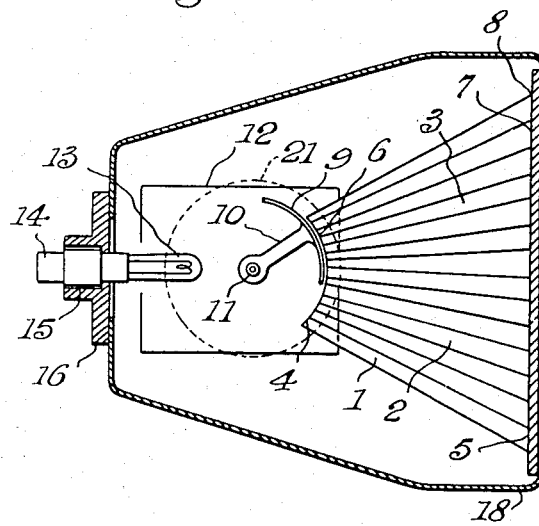
Fig.2.
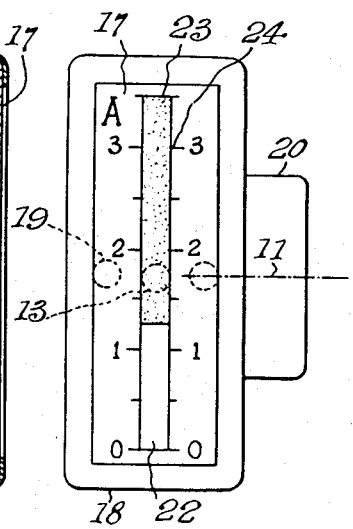
Fig.3.
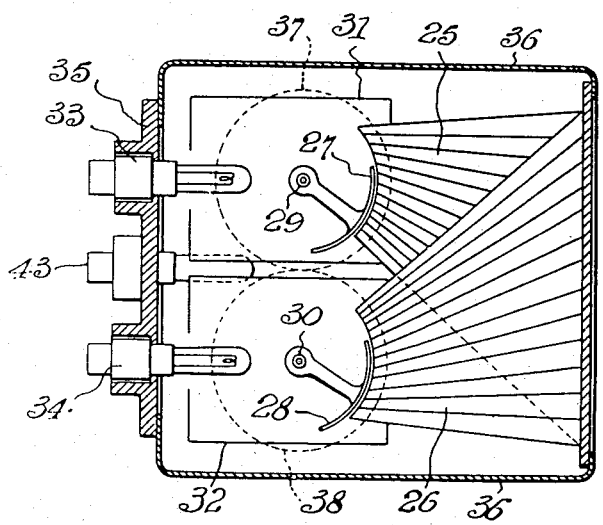
Fig.4.
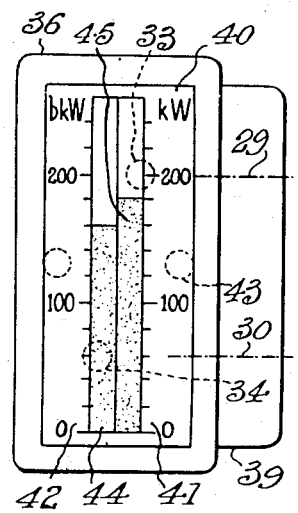
Fig.5.
Inventor:
Egbert von Mülinen,
By Pierce + Scheffler,
Attorneys Patented May 31, 1949

2,471,800

UNITED STATES PATENT OFFICE 2,471,800

SHADOW IMAGE PROJECTION INDICATING APPARATUS

Egbert von Müllnen, Ennetbaden, Switzerland

Application September 25, 1944, Serial No. 555,681
In Switzerland July 19, 1943

Section 1, Public Law 690, August 8, 1946
Patent expires July 19, 1963

6 Claims. (Cl. 88—24)

Enlarged shadow images of bodies can in a well known manner be produced by placing these bodies in the path of rays of an optical lens system. A more or less sharp or distorted image is obtained according to the quality of this system. If the shadow-throwing surface of the body moves on an arcuate path, the object glass must be spherically corrected to obtain a sufficiently sharp image on a plane image surface. The demands made on the quality and mechanical stability of this optical system are the greater, the smaller the moved body in comparison to the image produced. Also for economical reasons it is impossible to choose any size of aperture for the system. Practically the larger part of the light emitted by the focussed source of light for image projection becomes lost. Since, besides, with increasing dimensions of the aperture, increased difficulties are encountered in the production of the lenses, the distance between the source of light and the image is always considerably greater than the largest dimension of the image, and hence such a system for projecting shadow images is comparatively large and expensive.

This invention relates to a device for producing an enlarged shadow image of at least a part of a movable body exposed to at least one source of light, and its purpose is to avoid the disadvantages referred to above. The device is characterised by the feature that a plurality of tapered, rod-like bodies which are light transmittive in the axial direction and are arranged closely adjacent each other form at least one coherent light transmitting body; the several end faces at the entrance side of the bodies present a surface which is directly adjacent the shadow-throwing surface of the moving body, and through which enters the light which is transmitted to the shadow image surface lying behind the surface formed by the several end faces of the transmitting bodies at the outlet end. Thus, instead of a lens system I utilize a compact light-transmitting body the entrance end of which is illuminated more or less according to the moved body. At the illuminated places the light penetrates into the transparent transmitting bodies and is transmitted by these to the shadow surface. Their number and size chiefly depend on the desired degree of sharpness of the image. The smaller their cross-sectional area, the higher the degree of sharpness. The drawing shows several constructional examples of the invention. Fig. 1 represents diagrammatically a longitudinal section through a shadow band instrument adapted to indicate the angular position of the moving system of a measuring instrument as a function of the length of a band type shadow projected upon a graduated viewing screen. Fig. 2 is a front view of the instrument with scale, Fig. 3 shows a modified form of instrument with two measuring devices, i. e. a double instrument, Fig. 4 is a front view of the same instrument and Fig. 5 is fragmentary perspective showing a modified construction for the light transmitting elements.

In Fig. 1, 1 shows the narrow side of one of the rectangular, tapered light transmitting elements. A number of such elements superposed in a row form the light transmitting body which consists of two like halves 2 and 3. The entrance faces 4 together form the cylindrical entrance surface 6, the outlet end faces 5 lying in the plane 7. Applied to the outlet surface is a light-diffusing layer 8. The light transmitting bodies 1 may be hollow as indicated at 1a in Fig. 5 and have reflecting walls 1b; in the present instance they should preferably be made of a transparent artificial material which may be much lighter than glass. They can be obtained by founding, spraying, pressing or cut from suitably shaped plates.

Owing to the slight weight of the small light-transmitting bodies 2, 3, a light and yet strong instrument can be obtained. The transmitting bodies 1 are covered with a coating which prevents the passage of the light particularly that falling on the lateral surfaces. A reflecting coating is obtained e. g. by applying a light paint or by metallization. Foils may be inserted alternatively between the transmitting bodies. The bodies are held together either by pressure or by a bolt passing through the row. The transmitting bodies can also be firmly joined together by pasting them together or by subjecting the light transmitting body to a subsequent heat and pressure treatment. The joining process can also be ensured by forming a light transmitting body with its layers in a single working process.

With the present example of construction, it is intended to picture the angular position of the thin arcuate screen 9 which is fastened to the shaft 11 through an arm 10. To ascertain this position it is simply necessary to project an edge of the screen 9 on the scale 17. As can be seen on Fig. 2, the edge then separates an illuminated part 22 from the shaded portion 23. The length of the illuminated part is the measure of the turning angle of the measuring instrument 20, 21 which is arranged at the side of the optical system. The transmitting bodies at the light outlet end faces 7 have the same breadth as the light band which moves within the scales 24 located on both sides of the disc 17. At the entrance face 6 they may be narrower. They are preferably covered on the side by the body 9. The latter is blackened on the side away from the source of light so that light thrown on it cannot fall in uncovered transmitting bodies. For this reason the air gap between the screen 9 and the light entrance surface 6 must be as small as possible.

The screen 9 moves in the box 12 into which the source of light 13 projects. The light emanating therefrom is reflected by the walls of the box and is thrown from all directions with maximum brightness onto the uncovered portion of entrance surface 6. The source of light is therefore very well utilized. It must not be point shaped or centred. It is held by a simple holder 15, 16 in the casing 18 and can be withdrawn by means of a simple handle 14. Direct light should not be allowed to fall on the surface 6. Any alteration of the indicated measuring value may slightly alter the brightness. This can be avoided by maintaining constant the light-absorbing surface in the box 12. Unequal illumination of the light band can easily be corrected by suitably adjusting the relation between the entrance and outlet ends 4, 5 of the different transmitting bodies. The lack of sharpness of the image of the edge is due to the height of the section 5. By altering these heights, the variation of the scale can be slightly influenced. If the different transmitting bodies of which the enlargement system 2, 3 is composed have the same shape their breadth at the end of the outlet side should preferably be kept constant over a certain length.

As will be seen on Fig. 2 the light band and the scale are illuminated by different lamps 13 and 19. This allows several advantages. Contrarily to the known systems of using only one lamp cheaper and underheated lamps can be employed with the new device. In plants with luminous diagram the same lamps as used for illuminating the elements of the diagram may be employed for the instruments. The shadow band and the scale may be provided with lamps of different colours. A coloured light band or shadow can of course also be obtained if the moved body is transparent and coloured. In the case of measuring devices with central position, as for instance for the supply of energy, the screen 9 may have two light and shadow bands which are opposed to each other and may in addition be of different colours.

When certain positions are reached, the colour may be changed by switching in other lamps. Lamps may be supplied with flicker light, if desired. Further illuminated coloured light marks can easily be provided in the image of the scale, which may have a lamp of their own or be illuminated by a common source of light through a mechanical valve. If two lamps are used for the same purpose and one of them becomes defective, this will quickly be noticed by a weaker illumination.

The double instrument represented on Figs. 3 and 4 has two light transmitting bodies 25, 26 arranged one beside the other. The position of their axes is slanting with regard to the plane of the shadow image. They may lie in parallel planes, but warped so that the measuring devices 37, 38 can be arranged one above the other. Their shafts 29, 30 carry the screens 27, 28 which are preferably lodged in separated reflector boxes 31, 32 of like design. As will be seen on Fig. 4, the lamps 33, 34 are superposed and slightly displaced relative to each other in the vertical plane. The latter lamps as well as lamps 43 for the illumination of the scale 40 are held in the holder 35. With this arrangement the instrument casing 36 is of the same length as that shown on Fig. 1.

The two instruments 37, 38 which in the present application measure reactive and active power, respectively are supported within a casing 39 affixed to the side of housing 36 and the instrument indications are read in terms of the lengths of shadow bands 44, 45 on the graduated scales 41, 42 inscribed upon scale plate 40 which is illuminated brightly by lamps 43. The graduations may stand opaque against an illuminated scale plate 40 or vice versa.

I claim:

1. A measuring instrument and the like which comprises, in combination, a light source; a translucent light-diffusing shadow receiver bearing quantity measuring indicia; a screen which, in conjunction with said light source, casts a shadow for projection upon said receiver, said screen being a sector of a cylinder and mounted for pivotal movement about the cylinder axis in response to a quantity to be measured; and means for transmitting the shadow pattern from said screen to said receiver in a plurality of separate channels comprising a plurality of lengths of light-transmitting material having light receiving faces arranged to form a cylindrical mosaic surface lying closely adjacent to said shadow-casting screen and having light emitting faces arranged to form a mosaic lying closely adjacent to said receiver, the instrument being constructed and arranged whereby the position of the shadow upon the receiver indicates the value of the quantity being measured.

2. A measuring instrument and the like as defined in claim 1 wherein said lengths of light transmitting material are constituted by tubular bodies, the inside walls of which have a light-reflecting characteristic.

3. A measuring instrument and the like which comprises, in combination, a casing; a window in one face of said casing; a plane translucent light-diffusing shadow receiver bearing quantity measuring indicia positioned in said window; a box in said casing opposite said window; a light source in said box; a screen in said box, which screen, in conjunction with said light source, casts a shadow for projection upon said receiver, said screen being in the form of a sector of a cylinder and mounted for pivotal movement about the cylinder axis in response to a quantity to be measured; and shadow-pattern transmitting means comprising a plurality of lengths of solid light-transmitting material having light receiving faces arranged to form a cylindrical mosaic surface lying closely adjacent to said shadow-casting screen and having light emitting faces arranged to form a plane mosaic surface lying closely adjacent to said receiver, the instrument being constructed and arranged whereby the position of the shadow upon the receiver indicates the value of the quantity being measured.

4. A measuring instrument and the like as defined in claim 3 wherein said lengths of solid light transmitting material are provided, on their longitudinal surfaces, with a layer of material which will reflect light inwardly of said lengths of solid material.

5. A measuring instrument and the like as defined in claim 3 wherein said lengths of light transmitting material increase gradually in cross-sectional area from said screen towards said receiver.

EGBERT von MÜLINEN.

REFERENCES CITED

The following references are of record in the file of this patent:

UNITED STATES PATENTS

| Number | Name | Date |
| --- | --- | --- |
| 1,740,130 | Voss et al. | Dec. 17, 1929 |
| 1,751,584 | Hansell | Mar. 25, 1930 |
| 1,935,070 | Walther | Nov. 14, 1933 |
| 1,997,702 | Smith | Apr. 16, 1935 |
| 2,122,750 | Nicolson | July 5, 1938 |
| Re. 21,105 | Round | May 30, 1939 |
| 2,245,970 | Frantz | June 17, 1941 |
| 2,286,014 | Rowe | June 19, 1942 |

Certificate of Correction

Patent No. 2,471,800.   May 31, 1949.

EGBERT von MÜLINEN

It is hereby certified that error appears in the printed specification of the above numbered patent requiring correction as follows:

Column 5, line 12, claim 5, after the word and period "receiver." and before the signature insert the following claim:

> 6. A measuring instrument and the like as defined in claim 3 wherein a second light source is positioned in said casing for illuminating said shadow receiver.

and that the said Letters Patent should be read with this correction therein that the same may conform to the record of the case in the Patent Office.

Signed and sealed this 18th day of October, A. D. 1949.

[SEAL]

THOMAS F. MURPHY,
*Assistant Commissioner of Patents.*

Certificate of Correction

Patent No. 2,471,800.  May 31, 1949.

EGBERT von MÜLINEN

It is hereby certified that error appears in the printed specification of the above numbered patent requiring correction as follows:

Column 5, line 12, claim 5, after the word and period "receiver." and before the signature insert the following claim:

*6. A measuring instrument and the like as defined in claim 3 wherein a second light source is positioned in said casing for illuminating said shadow receiver.* and that the said Letters Patent should be read with this correction therein that the same may conform to the record of the case in the Patent Office.

Signed and sealed this 18th day of October, A. D. 1949.

[SEAL]

THOMAS F. MURPHY,
*Assistant Commissioner of Patents.*